United States Patent [19]
Ito

[11] 3,774,483
[45] Nov. 27, 1973

[54] TWO-STEP AUTOMATIC FEED SYSTEM FOR A MACHINE TOOL

[75] Inventor: Teruyuki Ito, Kariya Japan

[73] Assignee: Toyoda Koki Kabushiki Kaisha, Kariya-shi, Aichi-ken, Japan

[22] Filed: June 19, 1972

[21] Appl. No.: 264,064

[30] Foreign Application Priority Data
June 26, 1971  Japan.................................. 46/46575

[52] U.S. Cl................................................. 82/34 B
[51] Int. Cl................................................. B23b 3/36
[58] Field of Search............................. 82/34 B, 34

[56] References Cited
UNITED STATES PATENTS

| | | | |
|---|---|---|---|
| 2,687,663 | 8/1954 | Uth................................. | 82/34 B X |
| 2,600,213 | 6/1952 | Darash.......................... | 82/34 B X |
| 2,450,788 | 10/1948 | Foster............................ | 82/34 B X |

FOREIGN PATENTS OR APPLICATIONS

| | | | |
|---|---|---|---|
| 958,892 | 2/1957 | Germany............................ | 82/34 B |

Primary Examiner—Harrison L. Hinson
Attorney—E. F. Wenderoth et al.

[57] ABSTRACT

An automatic feed system for a machine tool is provided to change the feed conditions of a tool between rough machining and finishing steps. A sleeve is rotatably mounted on a bed and is connected with a driving shaft which operates to advance or retract a tool slide. A feed cylinder unit drives the sleeve rotationally in either direction. The sleeve carries three dogs located on the periphery for cooperation with respective stops which define, by abutment with the dogs, the ends of advancement and retraction of the tool slide in the rough machining and the finishing steps, respectively. A stop indexing cylinder unit is provided to selectively index those two stops which define the end of advancement in the rough machining step and the end of retraction in the finishing step into the path of movement of the associated dog. This permits a single machine tool to be used for both rough machining and finishing steps.

12 Claims, 4 Drawing Figures

3,774,483

TWO-STEP AUTOMATIC FEED SYSTEM FOR A MACHINE TOOL

BACKGROUND OF THE INVENTION

The invention relates to a two-step automatic feed system for a machine tool for automatically changing the feed conditions of a tool slide as between rough machining step and finishing step.

Machining of a work requires changing the feed conditions of a tool as between rough machining and finishing steps. Usual practice heretofore has been to use a pair of machine tools, one each for the rough machining step and the finishing step, respectively. This necessitates dismounting the work from one machine tool and mounting it on the finishing step, thereby resulting in an additional time which reduces the machining efficiency. Although a single machine tool has been used for both rough machining and finishing steps in a small lot production, the transfer from the rough machining step to the finishing step have to go through a troublesome procedure of changing the conditions such as the position, amount of feed, and feed rate of the tool slide and the like.

SUMMARY OF THE INVENTION

It is, therefore, an object of the present invention to provide an improved device for a machine tool for automatically changing the feed conditions of a tool slide between rough machining step and finishing step.

It is another object of the present invention to provide a two-step automatic feed system for a machine tool wherein the feed amount of a tool slide in the rough machining and the finishing steps are easily and rapidly set up by simple adjusting means.

It is still another object of the present invention to provide a two-step automatic feed system for a machine tool wherein an advancing end stop for defining the end of advancement of the tool slide for the rough machining step and a retraction end stop for defining the end of retraction of the tool slide for the finishing step are provided so as to be selectively indexed into the path of movement of a dog.

It is further object of the present invention to provide a two-step automatic feed system for a machine tool wherein the end of advancement of the tool slide for the rough machining step is set up in a position before the end of retraction of the tool slide for the finishing step and non-cutting stroke therebetween is automatically set up to a constant amount.

According to the present invention, these and other objects are achieved by providing a two-step automatic feed system for a machine tool having a tool slide thereon, which comprises a feed shaft operable to move the tool slide toward and away from a workpiece, a sleeve drivingly connected to the feed shaft, means for driving the sleeve, a first dog adjustably mounted on the sleeve, a retraction end stop adapted to abut against the first dog to thereby define the end of retraction of the tool slide for a rough machining step, a second dog adjustably mounted on the sleeve, an advancing end stop adapted to abut the second dog to thereby define the end of advancement of the tool slide for the rough machining step, a retraction end stop adapted to abut the second dog to thereby define the end of retraction of the tool slide for a finishing step, indexing means for selectively indexing the advancing end stop for the rough machining step and the retraction end stop for the finishing step into the path of movement of the second dog, a third dog mounted on the sleeve, and an advancing end stop adapted to abut against the third dog to thereby define the end of advancement of the tool slide for the finishing step.

BRIEF DESCRIPTION OF DRAWINGS

The invention will be better understood from the following description with reference to the drawing, in which :

Referring to FIG. 1, numeral 1 denotes a driving shaft, which has its forward end extending through a bed 2 to the machine operating location and which may be connected as its rear end portion (not shown) through a gearing, for example, with a threaded feed shaft for advancing and retracting a tool slide holding a tool. The bed 2 has secured thereto a bearing bush 3 which is coaxial with the driving shaft 1, and a sleeve 4 which rotatably carries to driving shaft 1 is journalled in the bush 3. One rear end of the sleeve 4 is formed with a gear 9 which meshes with a rack 8 which in turn is formed on a piston rod 7 of a piston 6 (FIG. 3) slidably received within a feed cylinder 5. The other or front end of the sleeve 4 has an increased diameter to form an enlarged portion 10, on which is formed a third dog 11 adapted to abut against an advancing end stop 31 of finishing step, as will be discribed later in further detail. The enlarged portion 10 is recessed to form a cylinder 12 therein in concentric relationship with the driving shaft 1. A piston 13 is keyed to the cylinder 12 so as to be slidable only in the axial direction, the piston 13 being rotatable and axially slidable with respect to the driving shaft 1. In one end face of the piston 13 is formed an inwardly tapering bore or a conical surface 13a which is adapted to fit with a conical surface 16a on a clutch member 16 that is secured to the end of the driving shaft 1 by means of nut and key. Spring 17 is disposed between the clutch member 16 and the piston 13 for urgingly disengaging one from the other, with an abutment 18 being interposed between one end of the spring and the piston. A passageway 20 of fluid under pressure to the cylinder 12 is provided in the bush 3 and the sleeve 4 and communicates with a port 21 on the bush. Fluid under pressure is supplied to the port 21 through a mannual change-over valve VI and normally urges the piston 13 to the left against the compressive force of the spring 17 to thereby cause the conical surfaces 13a, 16a to engage each other for imparting the rotation of the sleeve 4 to the driving shaft 1. However, the manual change-over valve VI may be switched to bring the piston to the position shown, thereby enabling a hand wheel 23 secured to the end of the clutch member 16 to rotate the driving shaft 1 for adjusting the position of the tool slide.

Figure 4:
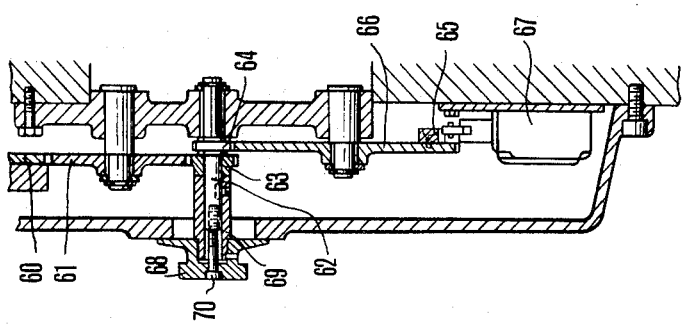
FIG. 4 is a section taken along the plane indicated by broken line IV-IV.
Figure 1:
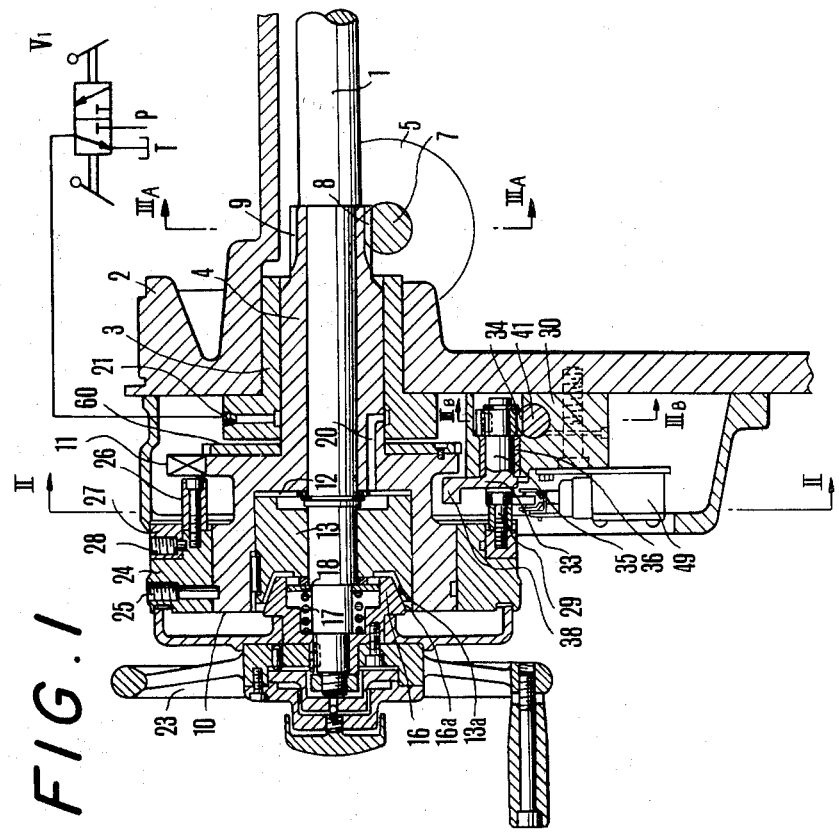
FIG. 1 is an elevational section of one embodiment of the invention.

On the outer periphery of the enlarged portion 10 is mounted a first adjusting ring 24, which can be held in place or released by tightening or loosening of a set screw 25 in order to make its phase relationship adjustable with respect to the enlarged portion 10. A first dog 26 is mounted on and project from the end face of the adjusting ring 24 and is adapted to abuts against a retraction end stop 32 of rough machining step, described later, for defining the end of retraction of the tool slide in the rough machining step. On the outer periphery of the first adjusting ring 24 is mounted a second adjusting ring 27, of which phase relationship with respect to the first adjusting ring 24 can be adjusted by loosening and tightening a set screw 28. A second dog 29 is mounted on and projects from the end face of the second adjusting ring 27 and is adapted to abut with its one end against an advancing end stop 37 of rough machining step, described later, for defining the end of advancement of the tool slide in the rough machining step, and also to abut against a retraction end stop 38 of finishing step, described later, for defining the end of retraction of the tool slide in the finishing step.

Figure 2:
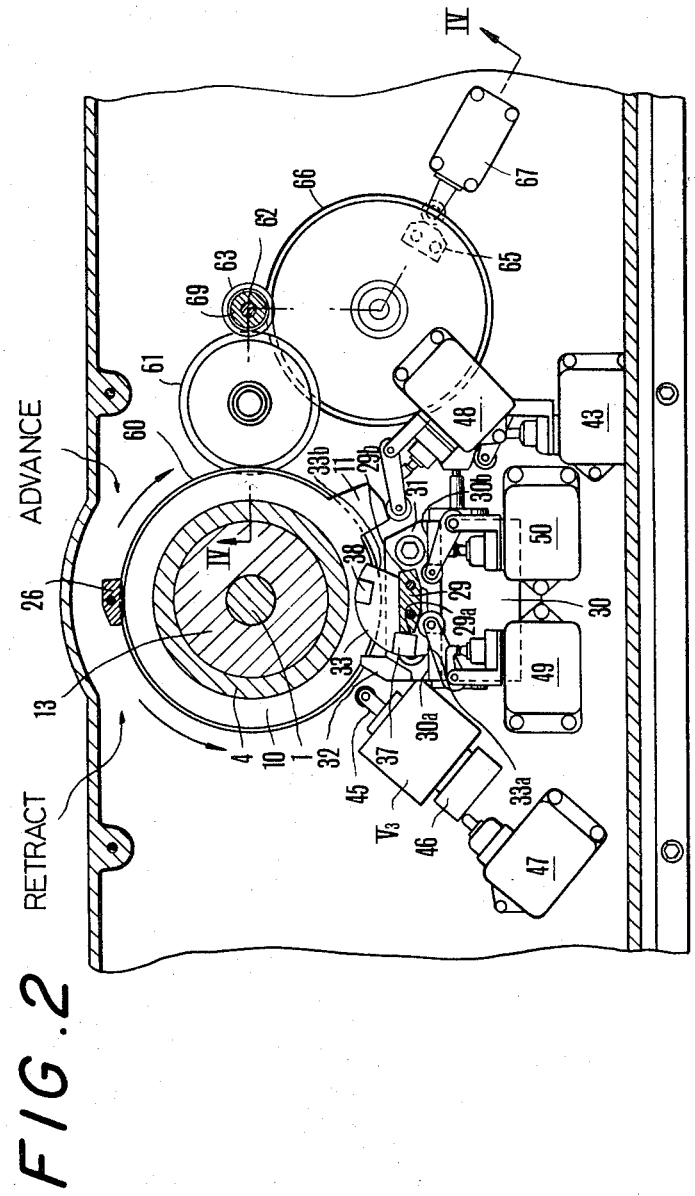
FIG. 2 is a cross-section taken along the line II—II shown in FIG. 1.
Figure 3:
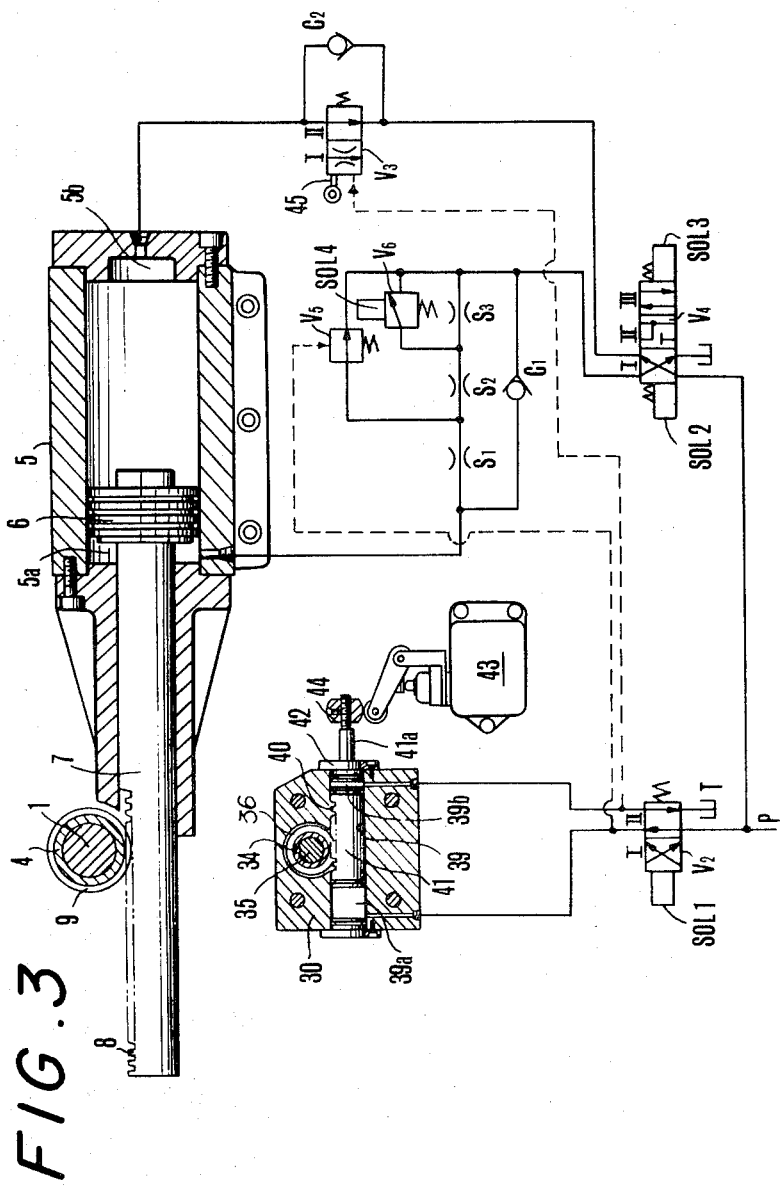
FIG. 3 shows cross-sections along the lines IIIA—IIIA and IIIB—IIIB shown in FIG. 1, along with the hydraulic circuit used in connection with the system.

A stop bracket 30 is secured to the bed and located in the path of movement of the dogs 11, 26. As shown in FIG. 2, the stop bracket 30 is formed with the stop 31 which is adapted to abut against the third dog 11 to define the end of advancement of the tool slide in the finishing step and also with the stop 32, mentioned above, which is adapted to abut against the first dog 26 to define the end of retraction of the tool slide in the rough machining step. A stop shaft 35 (FIG. 3) moving a sector portion 33 formed at its one end and having a gear 34 secured at its other end is journalled in the stop bracket 30 by means of a sleeve 36. As shown in FIG. 2, the end face of the sector portion 33 is formed with an advancing end stop 37 of rough machining step which is adapted to abut against the left-hand end face of the second dog 29 to define the end of advancement of the tool slide in the rough machining step, and also with a retraction end stop 38 of finishing step which is located at a position turned 90° clockwise from the stop 37 and which is adapted to abut against the right-hand end face 29b of the second dog 29 to define the end of retraction of the tool slide in the finishing step. As shown in FIG. 3, the stop bracket 30 is formed with a stop indexing cylinder 39 in which is slidably received a piston 41 having a rack 40 formed therewith, the rack 40 meshing with the gear 34 securedly mounted on the stop shaft 35. Fluid under pressure is supplied to or discharged from the left-hand and right-hand chambers 39a, 39b of the stop indexing cylinder 39 by way of a solenoid change-over valve V2. When the valve V2 is operated to supply and/or discharge the fluid to urge the piston 41, the stop shaft 35 is rotated to bring the end face 33a of the sector portion 33 into abutment with a stop surface 30a formed on the stop bracket 30 for indexing the stop 37 and for moving the stop 38 out of the path of movement of the second dog 29, or alternatively, the stop shaft 35 is rotated in the opposite direction to bring the opposite end face 33b of the sector portion 33 into abutment with a stop surface 30b formed on the stop bracket 30 for indexing the stop 38 and for moving the stop 37 out of the path of movement of the second dog 29.

At its one end, the piston 41 has a rod 41a which extends through a cylinder cap 42 and externally of the stop bracket 30, and the rod 41a L carries at its end a dog 44 which operates on a limit switch 43, serving the identification of the indexing of the stop shaft 35.

FIG. 2 also shows a valve V3 located in the path of movement of the first dog 26 and operable, in response to the pressure exerted by the first dog 26, to reduce the speed of retraction of the tool slide immediately before the first dog 26 abuts against the stop 32 so as to moderate impact upon abutment. A dog 46 is secured to the lower end of the spool 45 of the valve V3 and is operable to apply an urging pressure upon a limit switch 47 disposed below the valve V3, the limit switch 47 serving the identification of arrival of the tool slide at its end of retraction during the rough machining step. A limit switch 48 is located in the path of movement of the third dog 11 and is operable to identify the end of advancement of the tool slide during the finishing step as it is urged by the third dog 11.

Also limit switchs 49 and 50 are located in the path of movement of the second dog 29 to identify the end of advancement of the tool slide during the rough maching step and the end of retraction of the tool slide during the finishing step, respectively, as they are urged by the second dog 29.

On the side wall of the enlarged portion 10 formed integrally with the sleeve 4 is secured a gear 60 in concentric relationship with the sleeve 4, the gear 60 meshing through an intermediate gear 61 (FIG.4) with a gear 63. The gear 63 is loosely fitted on a shaft 62 which adjusts a position where the feed rate of the tool slide is reduced. The adjusting shaft 62 has a gear 64 formed thereon which meshes with a gear 66 of a greater diameter and carrying a dog 65. This dog 65 is adapted to operate a limit switch 67 which gives an indication for a reduction in the feed speed during the finishing step. A sleeve 69 having a dial 68 secured thereto is slidably mounted on and keyed to the adjusting shaft 62, and one end face thereof abuts against the side wall of the gear 63. When a bolt 70 threadably engaging the adjusting shaft 62 is loosened, the dial 68 can be turned to preset the speed reduction indicating dog 65 provided on the gear 66 at any desired position. When the bolt 70 is tightened, the end face of the sleeve 69 is held in abutting relationship against the side wall of the gear 63, thereby causing the gears 63 and 64 to rotate integrally.

Referring to FIG. 3 which shows the hydraulic circuit, a solenoid valve V4 is provided to control the advancement and retraction of the feed cylinder 5, and is associated with solenoids SOL 2 and SOL 3. When the solenoid SOL 2 is energized, the valve V4 is connected, as shown in FIG. 3 to supply pressure fluid to the right-hand chamber 5b of the feed cylinder 5, urging the piston 6 to the left and advancing the tool slide. Conversely, when the solenoid SOL 3 is energized, the valve V4 is switched to its ports III, whereby the tool slide is retracted. When both of the solenoids SOL2 and SOL3 are deenergized, the valve V4 is switched to its ports II, whereby the tool slide comes to rest. A valve V5 is provided to switch the feed speed of the piston 6. The valve V5, opens during the rough machining step to advance the tool slide at a rough machining feed rate determined by a restriction S1. A valve V6 associated with a solenoid SOL4 controls the speed during the finishing step, and when it is closed, causes the tool slide to advance at a slow feed rate determined by restrictions S1, S2 and S3 during the finishing step. A check valve C1 is provided across the restrictions S1, S2 and S3, and bypasses these restrictions when the ports III of the solenoid valve V4 are operative. The valve V3 is provided to control the speed of the tool slide during its retracting movement. In the finishing step, the valve V3 is switched to its ports I to cause the tool slide to retract at a slow feed rate, and in the rough machining step, the valve V3 is switched to its port II to cause the tool slide to retract at a fast feed rate. However, as the end of retraction is approached, the spool 45 is urged by the first dog 26 to switch the valve to its port I, whereby the tool slide is caused to retract at the slow feed rate. Another check valve C2 is connected across the valve V3, and bypasses this valve when the ports I of the solenoid valve V4 are operative.

The arrangement mentioned above operates as follows:

In all drawings, various parts are shown in their positions at the end of the rough machining step. At the commencement of the operation, the feed piston 6 is retracted and the first dog 26 abuts against the stop 32, so that the tool slide is located at the end of retraction. Under this condition, fluid under pressure is supplied through the ports II of the solenoid valve V2 to the left-hand chamber 39a of the stop indexing cylinder 39, thereby urging the piston 41 to the right, whereby the stop shaft 35 rotates to the position shown. The end face 33a of the sector portion 33 abuts against the stop surface 30a of the stop bracket 30 to index the stop 37, and the stop 38 is moved to its inoperative position. Now the solenoide SOL2 associated with the solenoid valve V4 is energized, whereby fluid under pressure is supplied to the right-hand chamber 5b of the feed cylinder 5 through the ports I of the solenoid valve V4 and the check valve C2, while fluid within the left-hand chamber 5a is discharged therefrom through the restriction S1, valve V5 and the ports I of the solenoid valve V4, so that the tool slide advances at a rate of rough machining step. When the tool slide reaches the end of advancement for the rough machining step, at which time the second dog 29 abuts against the stop 37, the limit switch 49 operates in response to the urging pressure from the second dog 29, whereby the solenoide valve V4 is switched to its ports III either immediately or after a given time interval. At this time, fluid under pressure is supplied through the ports III and the check valve C1 to the left-hand chamber 5a of the feed cylinder 5, while fluid within the right-hand chamber 5b is discharged therefrom through the ports II of the valve V3 and the ports III of the solenoid valve V4, so that the tool slide retract at the fast feed rate. As the tool slide retracts to a point adjacent the end of retraction for the rough machining step, the spool 45 of the valve V3 is urged by the first dog 26, whereby the valve V3 is switched to its ports I to reduce the speed of retracton. This moderates the impact of the first dog 26 upon abutment against the stop 32. As the first dog 26 abuts against the stop 32 and thus the tool slide reaches its end of retraction for the rough machining step, the limit switch 47 operates as urged by the dog 26. Thereupon, in case of a workpiece having a plurality of machining parts in the axial direction thereof is machined, the table of the machine tool may be indexed to a next indexing position for another machining part of the work in its axial direction. In this manner, all of the work parts to be machined are subject to rough machining, and then the work is subject to finishing operation.

When the tool slide has reached the end of advancement for the rough machining step of the last-to-machine part of the work the solenoid SOL2 is deenergized by a signal from a control circuit operably connected to the limit switch 49. Then, the solenoid valve V4 is switched to its ports II to interrupt the operation of the feed cylinder 5 upon completion of the rough machining step. The solenoid SOL 1 associated with the solenoid valve V2 is energized to switch it to the ports I and thus fluid under pressure is supplied to the right-hand chamber 39b of the stop indexing cylinder 39, thereby urging the piston 41 to the left with concurrent rotation of the stop shaft 35. As a result, the end face 33b of the sector portion 33 is brought into abutment against the stop surface 30b of the stop bracket 30 to index the stop 38 and to move the stop 37 to its inoperative position. Then the limit switch 43 is operated by the dog 44 to thereby energize the solenoid SOL3, whereby the solenoid valve V4 is switched to its ports III, and the valve V3 is switched to its ports I as a result of a pressure rise in the pilot section thereof which is connected to a fluid pressure source. Therefore, fluid under pressure is supplied to the left-hand chamber 5a of the feed cylinder 5 through the ports III of the solenoid valve V4 and the check valve C1, while fluid within the right-hand chamber 5b is discharged through the port I of the valve V3, with consequence that the tool slide retracts at the slow feed rate. As the second dog 29 abuts against the stop 38, the tool slide reaches the end of retraction for the finishing step. The distance by which the tool slide retracts from the end of advancement for the rough machining step to the end of retraction for the finishing step represents non-cutting stroke or gap which remains constant regardless of the position established as the end of retraction for the finishing step. When the tool slide reaches the end of retraction for the finishing step, the limit switch 50 is operated by the second dog 29, whereupon the working portions of the work to be machined are axially indexed to a machining position, wherein a tool machines the indexed one of the working portions. The solenoid valve V4 is switched to its ports I. The valve V5 is closed as a result of pressure fall in the pilot section thereof which is disconnected by the energization of solenoid SOL1 from the fluid pressure source, and the solenoid valve V6 is opened by the solenoid SOL4 which is energized by the operation of the limit switch 43. Consequently, fluid under pressure is supplied to the right-hand chamber 5b of the feed cylinder through the ports I of the solenoid valve V4 and the check valve C2, while fluid within the left-hand chamber 5a is discharged through the restrictions S1 and S2, solenoid valve V6 and the ports I of the solenoide valve V4, whereby the tool slide advances at the fast feed rate for the finishing step which is defined by the restriction S2. As the tool is fed into the work and the tool slide reaches a point adjacent the end of advancement for the finishing step, the dog 65 which is arranged responsive to the feed operation of the tool slide to emit an indication for speed reduction urges the limit switch 67 to give such an indication at the established position. In response thereto, the solenoid SOL4 is deenergized to close the valve V6, and now the fluid within the left-hand chamber 5a of the feed cylinder 5 is discharged through the restrictions S1, S2 and S3, so that the advancement of the tool slide takes place at the slow feed rate defined by the restriction S3. As the tool slide reaches the end of advancement for the finishing step as determined by the abutment of the third dog 11 against the stop 31, the limit switch 48 is operated by the third dog 11, whereby the solenoid valve V4 is switched to its ports III either immediately or after a given time interval. At this time, fluid under pressure is supplied to the left-hand chamber 5a of the feed cylinder 5 through the ports III of the solenoid valve V4 and the check valve C1, while fluid within the right-hand chamber 5b is discharged through the ports I of the valve V3 and the ports III of the solenoid valve V4, whereby the tool slide retracts at the slow feed rate. When the tool slide reaches the end of retraction as determined by the second dog 29 abutting against the stop 38, the limit switch 48 is operated by the third dog 11 to thereby energize the solenoids SOL4 and SOL3 again. In turn another part of the work is chosen for machining purpose, and the above described finishing step is continued until all of the work parts to be machined have undergone the finishing operation.

From the foregoing, it will be appreciated that with the arrangement of the invention, the ends of machining advancement and retraction of the tool slide as well as the feed rate during the machining operation can automatically be changed as the machining is switched from the rough machining to the finishing step or conversely to thereby increase the machining efficiency and that when transferring from the rough machining to the finishing step, the stop shaft 35 is indexed to assure that the end of retraction of the tool slide for the finishing step is established at a position immediately in front of the end of advancement thereof for the rough machining step in order to reduce non-cutting time during the finishing step.

What is claimed is :

1. A two-step automatic feed system for a machine tool having a tool slide thereon, comprising a feed shaft operable to move said tool slide toward and away from a workpiece, a sleeve drivingly connected to said feed shaft, means for driving said sleeve, a first dog adjustably mounted on said sleeve, a retraction end stop adapted to abut against said first dog to thereby define the end of retraction of said tool slide for a rough machining step, a second dog adjustably mounted on said sleeve, an advancing end stop adapted to abut said second dog to thereby define the end of advancement of said tool slide for said rough machining step, a retraction end stop adapted to abut said second dog to thereby define the end of retraction of said tool slide for a finishing step, indexing means for selectively indexing said advancing end stop for said rough machining step and said retraction and stop for said finishing step into the path of movement of said second dog, a third dog mounted on said sleeve, and an advancing end stop adapted to abut against said third dog to thereby define the end of advancement of said tool slide for said finishing step.

2. A two-step automatic feed system for a machine tool comprising a sleeve rotatably mounted on a bed and connected with a driving shaft which is operable to advance and retract a tool slide of the machine tool, a feed cylinder unit connected with said sleeve, a first dog mounted angularly adjustably on said sleeve, a rough machining step retraction end stop secured to said bed within the path of movement of said first dog and adapted to abut against said first dog to define the end of retraction of said tool slide for said rough machining step, a second dog mounted angularly adjustably on said sleeve, a rough machining step advancing end stop mounted on a stop shaft which is mounted on said bed, said stop shaft being adapted to be indexed into the path of movement of said second dog during the rough machining step so that said rough machining step advancing end stop may be located to abut against said second dog to thereby define the end of advancement of said tool slide for said rough machining step, a finishing step retraction end stop mounted on said stop shaft and adapted to be indexed into the path of movement of said second dog during the finishing step so that said finishing step retraction end stop is located to abut against said second dog to thereby define the end of retraction of said tool slide for the finishing step, a stop indexing cylinder unit operable to selectively index said rough machining step advancing end stop and said finishing step retraction end stop into the path of movement of said second dog, a third dog mounted on the sleeve, and a finishing step advancing end stop secured to the bed within the path of movement of said third dog and adapted to abut against said third dog to thereby define the end of advancement of said tool slide for the finishing step.

3. A two-step automatic feed system according to claim 2 in which said stop indexing cylinder unit comprises a stop bracket secured to said bed, a stop indexing cylinder formed within said stop bracket, and a piston received within said cylinder, said cylinder defining a pair of hydraulic chambers on opposite slides of said piston, said chambers being selectively connected with a supply of hydraulic fluid and a drain in a manner such that in the rough machining step, one of the chambers is connected with the supply of fluid under pressure and the other chamber is connected with the drain, while in the finishing step, said one chamber is connected with the drain and the other chamber is connected with the supply of fluid under pressure.

4. A two-step automatic feed system according to claim 3, further including a stop shaft journalled in the stop block, said stop shaft having one end extending through said stop block and carrying a sector portion thereon and being formed with a gear at its other ends, said gear meshing with a rack formed in said piston, whereby the sector portion rotates in one direction or in the other direction as said piston moves in said cylinder.

5. A two-step automatic feed system according to claim 4, in which said rough machining step advancing end stop and said finishing step retraction end stop are provided angularly spaced apart on said sector portion.

6. A two-step automatic feed system according to claim 5, in which the finishing step retraction end stop is located immediately in front of said rough machining step advancing end stop, thereby minimizing non-cutting time.

7. A two-step automatic feed system according to claim 2, in which said sleeve has an enlarged portion of an increased diameter at one end, said enlarged portion having said first, second and third dogs secured thereon.

8. A two-step automatic feed system according to claim 7, in which said enlargement has formed therein a cylinder coaxial with the driving shaft and through which said driving shaft extends, said cylinder receiving a piston which is axially slidable but is constrained from relative rotation with respect to said cylinder, said driving shaft freely extending through said piston, said piston having an inwardly tapering bore adapted to receive a clutch member of complementary shape and secured to said driving shaft, said clutch member being effective, upon engagement with the bore in said piston, to transmit the rotative motion of said sleeve to said driving shaft.

9. A two-step automatic feed system according to claim 8, in which the cylinder formed in said sleeve is connected with a supply of fluid under pressure for normally urging said piston therein into engagement with said clutch member, further including a spring interposed between said clutch member and said piston to move said piston out of engagement with said clutch member so that said driving shaft can be rotated by mannual means connected therewith when said cylinder is disconnected from the supply of fluid under pressure.

10. A two-step automatic feed system according to claim 7, in which each of said first and second dogs is securedly mounted on a respective adjusting ring which is fitted on said sleeve and which is angularly adjustable with respect to said sleeve.

11. A two-step automatic feed system according to claim 2, in which each of the dogs is adapted to operate a limit switch as said dog comes into abutment with its respective associated stop.

12. A two-step automatic feed system according to claim 3, in which said piston has a rod extending from its one end and through a cylinder cap to the exterior of said stop block, the free end of said piston rod being adapted to operate a limit switch as said piston moves to one extreme position within said cylinder.

* * * * *